United States Patent
Eromäki (10) Patent No.: US 10,082,640 B2
(45) Date of Patent: Sep. 25, 2018

(54) DUAL STAGE ACTUATOR

(71) Applicant: Microsoft Technology Licensing, LLC, Redmond, WA (US)

(72) Inventor: Marko Eromäki, Tampere (FI)

(73) Assignee: Microsoft Technology Licensing, LLC, Redmond, WA (US)

(*) Notice: Subject to any disclaimer, the term of this patent is extended or adjusted under 35 U.S.C. 154(b) by 176 days.

(21) Appl. No.: 15/163,656

(22) Filed: May 24, 2016

(65) Prior Publication Data
US 2017/0343770 A1    Nov. 30, 2017

(51) Int. Cl.
G02B 7/04    (2006.01)
G02B 7/10    (2006.01)
H02K 41/035  (2006.01)

(52) U.S. Cl.
CPC .......... *G02B 7/102* (2013.01); *H02K 41/035* (2013.01)

(58) Field of Classification Search
CPC .............................. G02B 7/102; H02K 41/035
See application file for complete search history.

(56) References Cited

U.S. PATENT DOCUMENTS

| | | | |
|---|---|---|---|
| 6,498,624 B1* | 12/2002 | Ogura | G02B 13/0055 348/220.1 |
| 7,457,061 B2 | 11/2008 | Sata et al. | |
| 2010/0053784 A1 | 3/2010 | Kang et al. | |
| 2011/0273789 A1 | 11/2011 | Knoedgen | |
| 2013/0314587 A1 | 11/2013 | Kriman et al. | |
| 2015/0130990 A1 | 5/2015 | Cho et al. | |
| 2015/0319345 A1 | 11/2015 | Park | |
| 2015/0346584 A1 | 12/2015 | Kim et al. | |
| 2015/0358528 A1 | 12/2015 | Brodie et al. | |
| 2016/0011394 A1 | 1/2016 | Cho et al. | |
| 2016/0259094 A1* | 9/2016 | Aschwanden | G02B 3/14 |

FOREIGN PATENT DOCUMENTS

| | | |
|---|---|---|
| CN | 104995556 A | 10/2015 |
| EP | 2860556 A1 | 4/2015 |
| KR | 101459585 B1 | 11/2014 |
| KR | 20150109894 A | 10/2015 |
| WO | 2012154769 A1 | 11/2012 |

OTHER PUBLICATIONS

"International Search Report and Written Opinion Issued in PCT Application No. PCT/US2017/033200", dated Aug. 31, 2017, 16 Pages.

Chung, et al., "Development of compact camera module having auto focus actuator and mechanical shutter system for mobile phone", In International Conference on Control, Automation and Systems, Oct. 17, 2007, pp. 2319-2322.

Liu, et al., "Design and Characterization of Miniature Auto-Focusing Voice Coil Motor Actuator for Cell Phone Camera Applications", In Journal of IEEE Transactions on Magnetics, vol. 45, Issue 1, Jan. 2009, pp. 155-159.

* cited by examiner

*Primary Examiner* — Joseph P Martinez (57) ABSTRACT

An electromagnetic actuator comprises a dual stage action, wherein the actuator comprises an electromagnetic element between two ferromagnetic elements. An electric current driven through the electromagnetic element causes a magnetic field of the electromagnetic element to interact with the magnetic fields of the two ferromagnetic elements.

20 Claims, 5 Drawing Sheets

DUAL STAGE ACTUATOR

BACKGROUND

Digital cameras usually comprise a lens and a sensor for capturing an image by collecting light and converting it into electrical signals. Mobile electronic devices such as smart phones are usually equipped with an imaging apparatus, for example, a camera. The imaging quality of the mobile electronic devices may be improved by optical image stabilization or autofocus. A current trend in designing mobile electronic devices aims for thin devices, wherein the form factor benefits from thin imaging apparatus to be housed inside the mobile electronic device.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

An electromagnetic actuator comprises a dual stage action, wherein the actuator comprises an electromagnetic element between two ferromagnetic elements. An electric current driven through the electromagnetic element causes a magnetic field of the electromagnetic element to interact with the magnetic fields of the two ferromagnetic elements. A slider element, such as a linear bearing, between the electromagnetic element and the two ferromagnetic elements allows the movement of the actuator. The returning movement may be effected with an electric current in the opposite direction, causing the poles of the magnetic field to be reversed, the magnetic fields interacting in an opposite manner and the actuator returning to the original position. In one embodiment the returning action is effected with a returning spring. The dual stage structure allows a flat electromagnetic actuator design. The structure also allows imaging apparatuses with better optical characteristics to be implemented, for example, in very thin devices. Devices with various other form factors may benefit from smaller imaging apparatus as there is more room to implement other features to the device.

Many of the attendant features will be more readily appreciated as they become better understood by reference to the following detailed description considered in connection with the accompanying drawings. The embodiments described below are not limited to implementations which solve any or all of the disadvantages of known imaging apparatuses integrated in hand-held devices.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present embodiments and is not intended to represent the only forms in which the present embodiments may be constructed or utilized. However, the same or equivalent functions and sequences may be accomplished by different embodiments.

Although the present embodiments are described and illustrated herein as being implemented in a smartphone, the device described is provided as an example and not a limitation. As those skilled in the art will appreciate, the present embodiments are suitable for application in a variety of different types of mobile and/or hand-held apparatuses, e.g. in tablets, laptops, digital cameras or gaming consoles.

Figure 1:
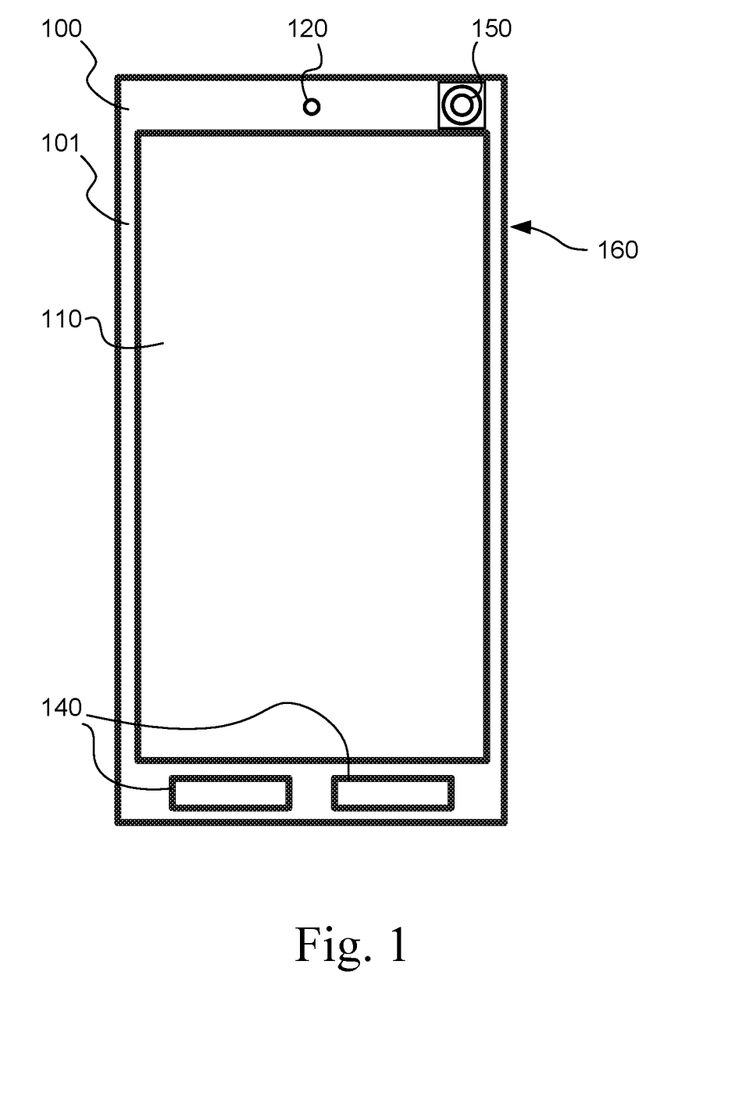
FIG. 1 shows one embodiment of an electronic device incorporating an imaging apparatus.

FIG. 1 shows a front side of one example of an electronic device incorporating an imaging apparatus, wherein one embodiment of the electronic device is a smartphone. The electronic device comprises a body 100 comprising a display 110, a speaker 120, a microphone 130 and keys 140. The electronic device comprises an imaging apparatus 150, a camera on one side. The electronic device may comprise one camera or more cameras, for example a front camera 150 on the front side and another imaging apparatus, a rear camera 160 on the rear side. The camera hardware may comprise at least one of: a processor, a controller, a memory, or a sensor such as a gyroscope. A wiring, such a flex cable may connect the imaging apparatus to the electronic device.

Figure 2:
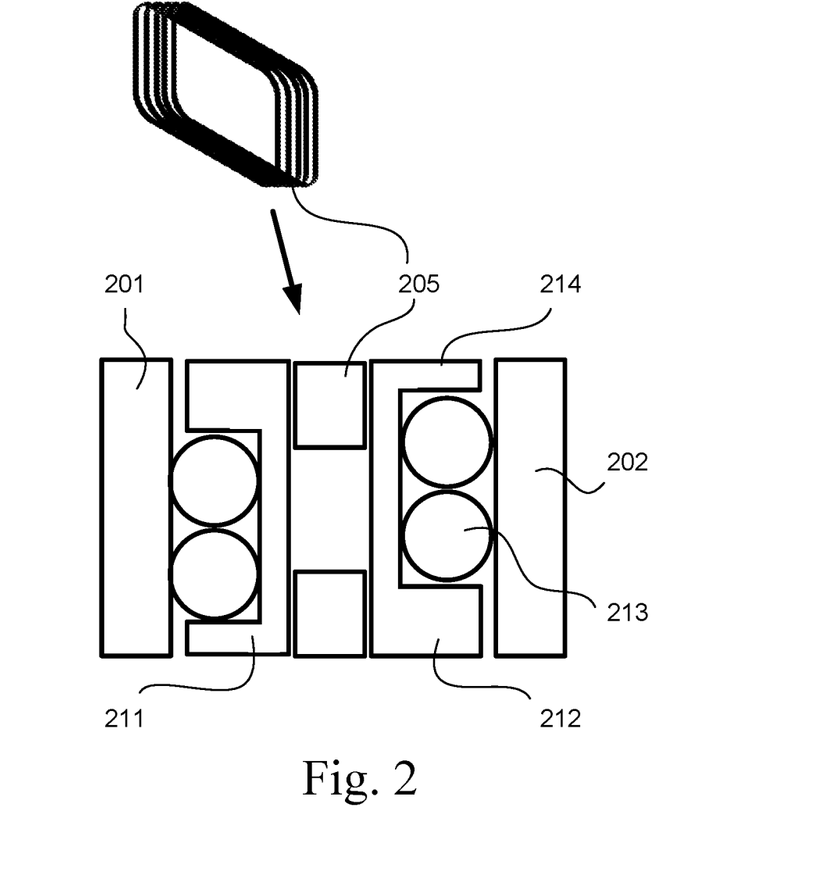
FIG. 2 is a simplified view illustrating one embodiment of an actuator structure.

FIG. 2 is a simplified view illustrating one embodiment of an actuator structure. A first ferromagnetic element 201 is configured to be coupled to a device body 230 or a supporting structure 230 to which the actuator may be attached to. The first ferromagnetic element 201 is coupled to the device 230 from a first side of the actuator. The first ferromagnetic element 201 may be covered with a housing to enable securing it to the device body 230. In an embodiment the first ferromagnetic element 201 comprises a permanent magnet, having poles aligned to generate a first magnetic field and configured to be connected to a device body on the first side of the actuator. An electromagnetic element 205 is coupled to the first ferromagnetic element 201 with a first slider element 211. The first slider element 211 enables guided vertical movement of the electromagnetic element 205. In an embodiment the electromagnetic element 205 comprises a coil made of electric conductor such as electric wire. The electromagnetic element is visualized in the cross-sectional view transversely to the electric wire. The electric current may be fed to the electromagnetic element via an electric conductor or any controllable conductor that may be implemented in the actuator structure. The electromagnetic element 205 comprises poles aligned to generate a second magnetic field as a response to an electric current passing through the electromagnetic element 205. The second magnetic field is configured to interact with the first magnetic field, causing a force to be applied on the electromagnetic element 205 and further causing it to move along the first slider element 211.

A second ferromagnetic element 202 is coupled to the electromagnetic element 205 with a second slider element 212. The second slider element 212 provides guided vertical movement of the second ferromagnetic element 202 in relation to the electromagnetic element 205. The second ferromagnetic element 202 may be enclosed in a housing to enable securing it to an object such as an optical element. In an embodiment the second ferromagnetic element 202 comprises a permanent magnet, having poles aligned to generate a third magnetic field and configured to be connected to the object on a second side of the actuator. The second ferromagnetic element 202 comprises poles aligned to generate a third magnetic field. The third magnetic field is configured to interact with the second magnetic field, causing a force to be applied on the second ferromagnetic element 202 and further causing it to move along the second slider element 212.

The electric current in the electromagnetic element 205 causes the electromagnetic element 205 to move along the first slider element 211 and the second ferromagnetic element 202 to move along the second slider element 212. The poles of the magnetic field of the ferromagnetic elements 201, 202 are aligned to cause force to be applied in the same direction when the electromagnetic element 205 forms the magnetic field to interact with them. When the electric current is run through the electromagnetic element 205, the electromagnetic element 205 and the second ferromagnetic element 202 move to the same direction simultaneously, causing a dual stage action or a telescopic action of the actuator. The structure may allow an extended operating range for the electromagnetic actuator while also enabling a flat design. In an embodiment the height of the actuator structure is between 3 mm to 5 mm in the retracted position, making it suitable for mobile applications.

Figure 3:
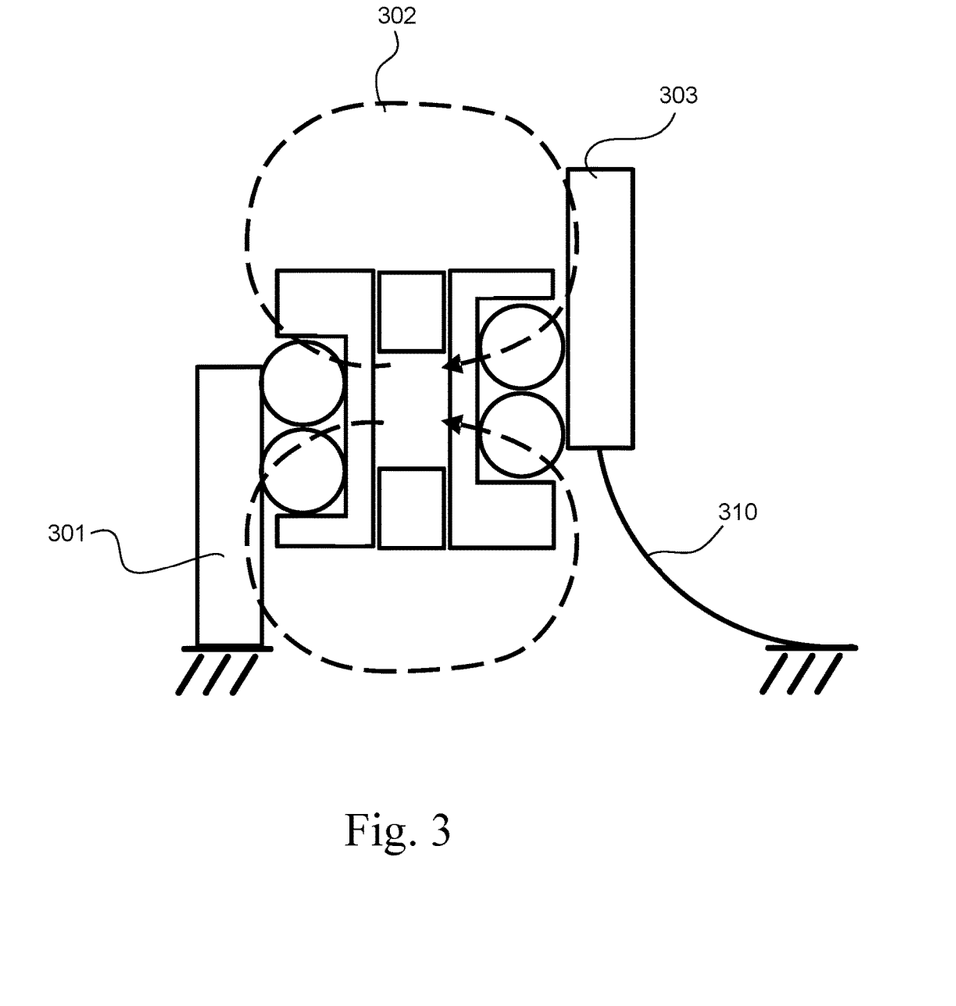
FIG. 3 illustrates schematically the magnetic fields in the structure.

FIG. 3 illustrates schematically the magnetic fields in the structure. The first magnetic field 301 is configured to interact with the second magnetic field 302, causing a force lifting the electromagnetic element 205. The third magnetic field 303 is also configured to cause the second ferromagnetic element to lift as a response to adjacent magnetic fields, wherein similar poles repel each other and different poles attract each other.

In an embodiment, the actuator comprises a returning spring 310 configured to apply a force against the movement of the second ferromagnetic element 202 or the movement of the electromagnetic element 205. The actuator may be used to actuate to positions between the extremes, for example by limiting the electric current applied to the electromagnetic element to a level counteracting the force applied by the returning spring. In an embodiment the position of the actuator is controlled by quickly alternating the current applied to the electromagnetic element 205, wherein the position between the extremes may be monitored via a feedback system obtained from the device, for example from a position of an optical element that is detected from the image processing system. In one embodiment the focus of the optical system is controlled by the actuator, and the correct focus for the feedback may be obtained from image contrast variation.

Figure 4:
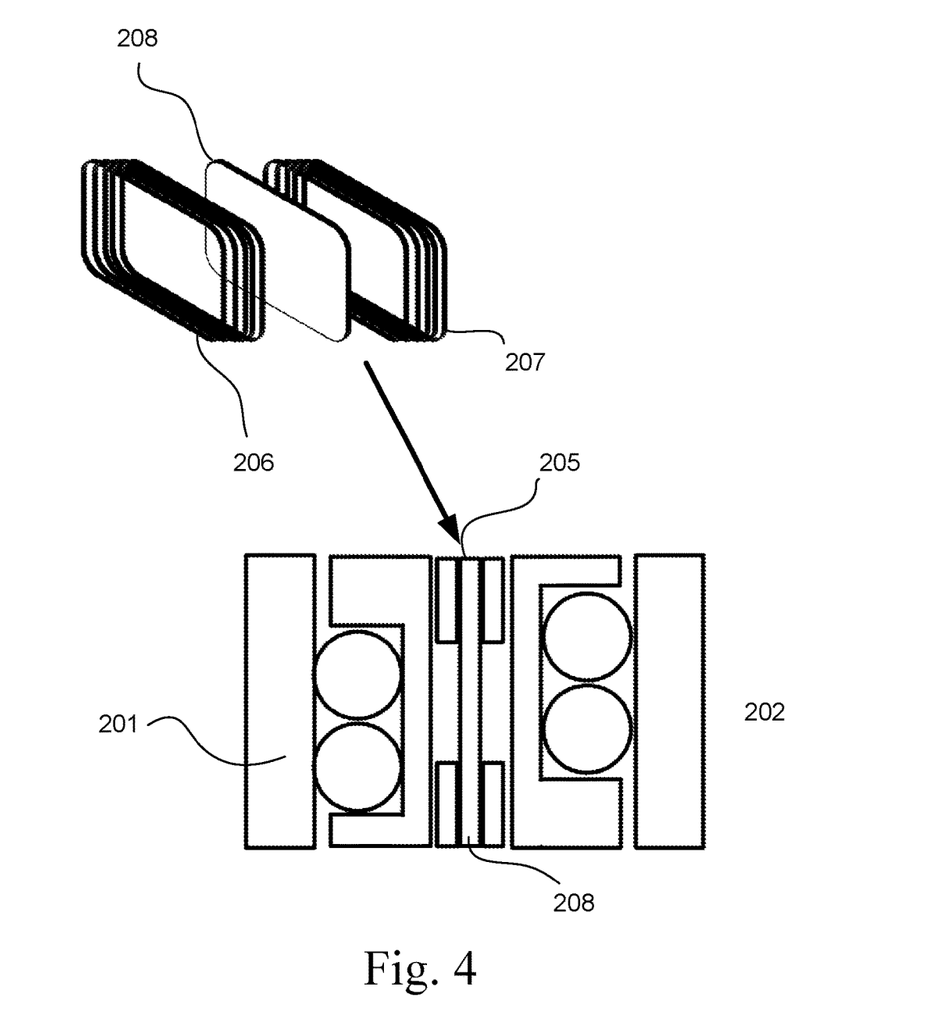
FIG. 4 shows an embodiment of the electromagnetic element.

FIG. 4 shows an embodiment of the electromagnetic element 205 having a sheet 208 for controlling the interference between the first magnetic field and the third magnetic field. The electromagnetic element 205 comprises a first electromagnetic portion 206 and a second electromagnetic portion 207. Both portions comprise a coil made of electric wire. The sheet 208 made of ferromagnetic metal is arranged between the first electromagnetic portion 206 and the second electromagnetic portion 208, shaping the effect of the first magnetic field to interact with the first electromagnetic portion 206 and the third magnetic field to interact with the second electromagnetic portion 207.

In one embodiment, the first slider element 211 and/or the second slider element 212 comprises a linear-motion bearing configured to provide free guided motion in one direction. The first slider element 211 and the second slider element 212 are not limited to be similar, in one embodiment the slider elements 211, 212 comprise different structures. The slider elements 211, 212 may comprise ball bearings having balls 213 and a housing 214, as illustrated in the figures. In one embodiment the first slider element 211 and/or the second slider element 212 comprise a flexure bearing, for example the portion of the slider element 211, 212 may be suspended by at least one sheet metal configured to bend accordingly.

In one embodiment, the actuator comprises more than two stages configured to move. A second electromagnetic element may be coupled to the other side of the second ferromagnetic element 202, following a third ferromagnetic element after the second electromagnetic element. The functionality may be catenated. The sheet inside the electromagnetic element may reduce the effect of magnetic interference in the catenated arrangement.

The disclosed actuator may be used in several applications that benefit from flat structure. The actuator allows the imaging apparatus, the device or the system to be designed flat-shaped. The multiple stages having multiple slider elements provides improved operating range for an electromagnetic actuator.

Figure 5:
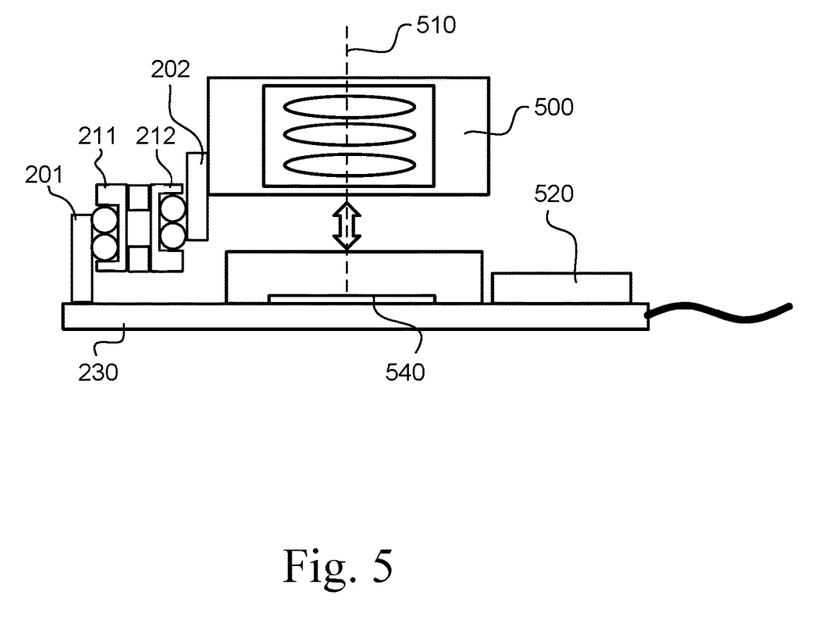
FIG. 5 shows a simplified view of one embodiment.

FIG. 5 shows a simplified view of one embodiment, wherein the actuator is configured to move a lens group 500 along an optical axis 510. The device may be an imaging apparatus, such as a camera. The imaging apparatus comprises an image sensor 540 and hardware 520 such as at least one processor and memory to enable the digital imaging. In one embodiment the actuator is configured to operate a protruding camera lend or lens group 500. In one embodiment, the actuator is configured to operate zoom or autofocus function. In one embodiment, the actuator forms a system inside a device. In one embodiment, the actuator and the imaging apparatus form a system inside a device. In one embodiment, the device comprises multiple components forming a system.

One aspect discloses an actuator, comprising a first ferromagnetic element having poles aligned to generate a first magnetic field and configured to be connected to a device body on a first side of the actuator; an electromagnetic element having poles aligned to generate a second magnetic field as a response to an electric current passing through the electromagnetic element, wherein the second magnetic field is configured to interact with the first magnetic field; a first slider element configured between the first ferromagnetic element and the electromagnetic element; a second ferromagnetic element having poles aligned to generate a third magnetic field and configured to be connected to an optical element on a second side of the actuator, wherein the third magnetic field is configured to interact with the second magnetic field; and a second slider element configured between the second ferromagnetic element and the electromagnetic element, having a movement aligned with the first slider element; wherein the electric current in the electromagnetic element causes the electromagnetic element to move along the first slider element and the second ferromagnetic element to move along the second slider element. In an embodiment the actuator comprises a returning spring configured to apply a force against the movement of the second ferromagnetic element. In an embodiment the actuator comprises a returning spring configured to return the actuator to a starting position. In an embodiment the actuator comprises a first electromagnetic portion, a second electromagnetic portion and a sheet made of ferromagnetic metal between the first electromagnetic portion and the second electromagnetic portion. In an embodiment the slider element comprises a linear-motion bearing. In an embodiment the slider element comprises a flexure bearing.

Alternatively or in addition, one aspect discloses an imaging apparatus, comprising a body; an actuator coupled to the body, the actuator comprising a first ferromagnetic element having poles aligned to generate a first magnetic field and configured to be connected to a device body on a first side of the actuator; an electromagnetic element having poles aligned to generate a second magnetic field as a response to an electric current passing through the electromagnetic element, wherein the second magnetic field is configured to interact with the first magnetic field; a first slider element configured between the first ferromagnetic element and the electromagnetic element; a second ferromagnetic element having poles aligned to generate a third magnetic field and configured to be connected to an optical element on a second side of the actuator, wherein the third magnetic field is configured to interact with the second magnetic field; and a second slider element configured between the second ferromagnetic element and the electromagnetic element, having a movement aligned with the first slider element; wherein the electric current in the electromagnetic element causes the electromagnetic element to move along the first slider element and the second ferromagnetic element to move along the second slider element. In an embodiment the imaging apparatus comprises a returning spring configured to apply a force against the movement of the second ferromagnetic element. In an embodiment the imaging apparatus comprises a returning spring configured to return the actuator to a starting position. In an embodiment the electromagnetic element comprises a first electromagnetic portion, a second electromagnetic portion and a sheet made of ferromagnetic metal between the first electromagnetic portion and the second electromagnetic portion. In an embodiment the imaging apparatus comprises a linear-motion bearing. In an embodiment the slider element comprises a flexure bearing. In an embodiment the actuator is configured to move a lens group along an optical axis.

Alternatively or in addition, one aspect discloses a system, comprising an imaging apparatus; a body; an actuator coupled to the body, the actuator comprising a first ferromagnetic element having poles aligned to generate a first magnetic field and configured to be connected to a device body on a first side of the actuator; an electromagnetic element having poles aligned to generate a second magnetic field as a response to an electric current passing through the electromagnetic element, wherein the second magnetic field is configured to interact with the first magnetic field; a first slider element configured between the first ferromagnetic element and the electromagnetic element; a second ferromagnetic element having poles aligned to generate a third magnetic field and configured to be connected to an optical element on a second side of the actuator, wherein the third magnetic field is configured to interact with the second magnetic field; and a second slider element configured between the second ferromagnetic element and the electromagnetic element, having a movement aligned with the first slider element; wherein the electric current in the electromagnetic element causes the electromagnetic element to move along the first slider element and the second ferromagnetic element to move along the second slider element. In an embodiment the system comprises a returning spring configured to apply a force against the movement of the second ferromagnetic element. In an embodiment the system comprises a returning spring configured to return the actuator to a starting position. In an embodiment the electromagnetic element comprises a first electromagnetic portion, a second electromagnetic portion and a sheet made of ferromagnetic metal between the first electromagnetic portion and the second electromagnetic portion. In an embodiment the slider element comprises a linear-motion bearing. In an embodiment the slider element comprises a flexure bearing. In an embodiment the actuator is configured to move a lens group along an optical axis.

An example of the apparatus or a system described hereinbefore is a computing-based device comprising one or more processors which may be microprocessors, controllers or any other suitable type of processors for processing computer executable instructions to control the operation of the device in order to control one or more sensors, receive sensor data and use the sensor data. Platform software comprising an operating system or any other suitable platform software may be provided in the computing-based device to enable application software to be executed on the device.

The computer executable instructions may be provided using any computer-readable media that is accessible by the computing based device. Computer-readable media may include, for example, computer storage media such as memory and communications media. Computer storage media, such as memory, includes volatile and non-volatile, removable and non-removable media implemented in any method or technology for storage of information such as computer readable instructions, data structures, program modules or the like Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media is shown within the computing-based device it will be appreciated that the storage may be distributed or located remotely and accessed via a network or other communication link, for example by using communication interface.

The computing-based device may comprise an input/output controller arranged to output display information to a display device which may be separate from or integral to the computing-based device. The display information may provide a graphical user interface, for example, to display hand gestures tracked by the device using the sensor input or for other display purposes. The input/output controller is also arranged to receive and process input from one or more devices, such as a user input device (e.g. a mouse, keyboard, camera, microphone or other sensor). In some embodiments the user input device may detect voice input, user gestures or other user actions and may provide a natural user interface (NUI). This user input may be used to configure the device for a particular user such as by receiving information about bone lengths of the user. In an embodiment the display device may also act as the user input device if it is a touch sensitive display device. The input/output controller may also output data to devices other than the display device, e.g. a locally connected printing device.

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

Any range or device value given herein may be extended or altered without losing the effect sought.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments or a combination thereof. The embodiments are not limited to those that solve any or all of the stated problems or those that have any or all of the stated benefits and advantages. It will further be understood that reference to 'an' item refers to one or more of those items.

In the above description, some component, device, module, unit, or element "being configured to" operate in a specific manner or to carry out specific operations, or carrying out such operations when in use, refers to that component, device, module, unit, or element comprising, or itself serving as, "means for" operating in that manner or carrying out those operations.

For example the first ferromagnetic element having poles aligned to generate the first magnetic field and being configured to be connected to the device body comprises, or serves as, means for connecting the ferromagnetic element to the device body. As another example, the second magnetic field being configured to interact with the first magnetic field comprises, or serves as, means for the magnetic fields generated by the first ferromagnetic element and the electromagnetic element interacting, wherein the effect of the interacting magnetic fields causes a force between the magnetic element and the ferromagnetic element and subsequently movement in the actuator.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to or combinations of the disclosed embodiments without departing from the spirit or scope of this specification.

The invention claimed is:

1. An actuator, comprising:
a first ferromagnetic element having poles aligned to generate a first magnetic field and configured to be connected to a device body on a first side of the actuator;
an electromagnetic element having poles aligned to generate a second magnetic field as a response to an electric current passing through the electromagnetic element, wherein the second magnetic field is configured to interact with the first magnetic field;
a first slider element configured between the first ferromagnetic element and the electromagnetic element;
a second ferromagnetic element having poles aligned to generate a third magnetic field and configured to be connected to an optical element on a second side of the actuator, wherein the third magnetic field is configured to interact with the second magnetic field; and
a second slider element configured between the second ferromagnetic element and the electromagnetic element, having a movement aligned with the first slider element; wherein
the electric current in the electromagnetic element causes the electromagnetic element to move along the first slider element and the second ferromagnetic element to move along the second slider element.

2. An actuator according to claim 1, comprising the electric current in the electromagnetic element causes the electromagnetic element to move along the first slider element and the second ferromagnetic element to move along the second slider element thereby resulting in a movement of the second ferromagnetic element with respect to the first ferromagnetic element based on interactions between the first, second, and third magnetic fields.

3. An actuator according to claim 1, comprising a returning spring configured to return the actuator to a starting position.

4. An actuator according to claim 1, wherein the electromagnetic element comprises a first electromagnetic portion, a second electromagnetic portion and a sheet made of ferromagnetic metal between the first electromagnetic portion and the second electromagnetic portion.

5. An actuator according to claim 1, wherein the slider element comprises a linear-motion bearing.

6. An actuator according to claim 1, wherein the slider element comprises a flexure bearing.

7. An imaging apparatus, comprising:
a body;
an actuator coupled to the body,
the actuator comprising a first ferromagnetic element having poles aligned to generate a first magnetic field and configured to be connected to a device body on a first side of the actuator;
an electromagnetic element having poles aligned to generate a second magnetic field as a response to an electric current passing through the electromagnetic element, wherein the second magnetic field is configured to interact with the first magnetic field;
a first slider element configured between the first ferromagnetic element and the electromagnetic element;
a second ferromagnetic element having poles aligned to generate a third magnetic field and configured to be connected to an optical element on a second side of the actuator, wherein the third magnetic field is configured to interact with the second magnetic field; and
a second slider element configured between the second ferromagnetic element and the electromagnetic element, having a movement aligned with the first slider element; wherein
the electric current in the electromagnetic element causes the electromagnetic element to move along the first slider element and the second ferromagnetic element to move along the second slider element.

8. An imaging apparatus according to claim 7, comprising a returning spring configured to apply a force against the movement of the second ferromagnetic element.

9. An imaging apparatus according to claim 7, comprising the electric current in the electromagnetic element causes the electromagnetic element to move along the first slider element and the second ferromagnetic element to move along the second slider element thereby resulting in a movement of the second ferromagnetic element with respect to the first ferromagnetic element based on interactions between the first, second, and third magnetic fields.

10. An imaging apparatus according to claim 7, wherein the electromagnetic element comprises a first electromagnetic portion, a second electromagnetic portion and a sheet made of ferromagnetic metal between the first electromagnetic portion and the second electromagnetic portion.

11. An imaging apparatus according to claim 7, wherein the slider element comprises a linear-motion bearing.

12. An imaging apparatus according to claim 7, wherein the slider element comprises a flexure bearing.

13. An imaging apparatus according to claim 7, wherein the actuator is configured to move a lens group along an optical axis.

14. A system, comprising:
an imaging apparatus;
a body;
an actuator coupled to the body,
the actuator comprising a first ferromagnetic element having poles aligned to generate a first magnetic field and configured to be connected to a device body on a first side of the actuator;
an electromagnetic element having poles aligned to generate a second magnetic field as a response to an electric current passing through the electromagnetic element, wherein the second magnetic field is configured to interact with the first magnetic field;
a first slider element configured between the first ferromagnetic element and the electromagnetic element;
a second ferromagnetic element having poles aligned to generate a third magnetic field and configured to be connected to an optical element on a second side of the actuator, wherein the third magnetic field is configured to interact with the second magnetic field; and
a second slider element configured between the second ferromagnetic element and the electromagnetic element, having a movement aligned with the first slider element; wherein
the electric current in the electromagnetic element causes the electromagnetic element to move along the first slider element and the second ferromagnetic element to move along the second slider element.

15. A system according to claim 14, comprising the electric current in the electromagnetic element causes the electromagnetic element to move along the first slider element and the second ferromagnetic element to move along the second slider element thereby resulting in a movement of the second ferromagnetic element with respect to the first ferromagnetic element based on interactions between the first, second, and third magnetic fields.

16. A system according to claim 14, comprising a returning spring configured to return the actuator to a starting position.

17. A system according to claim 14, wherein the electromagnetic element comprises a first electromagnetic portion, a second electromagnetic portion and a sheet made of ferromagnetic metal between the first electromagnetic portion and the second electromagnetic portion.

18. A system according to claim 14, wherein the slider element comprises a linear-motion bearing.

19. A system according to claim 14, wherein the slider element comprises a flexure bearing.

20. A system according to claim 14, wherein the actuator is configured to move a lens group along an optical axis.

* * * * *